Figure 1:
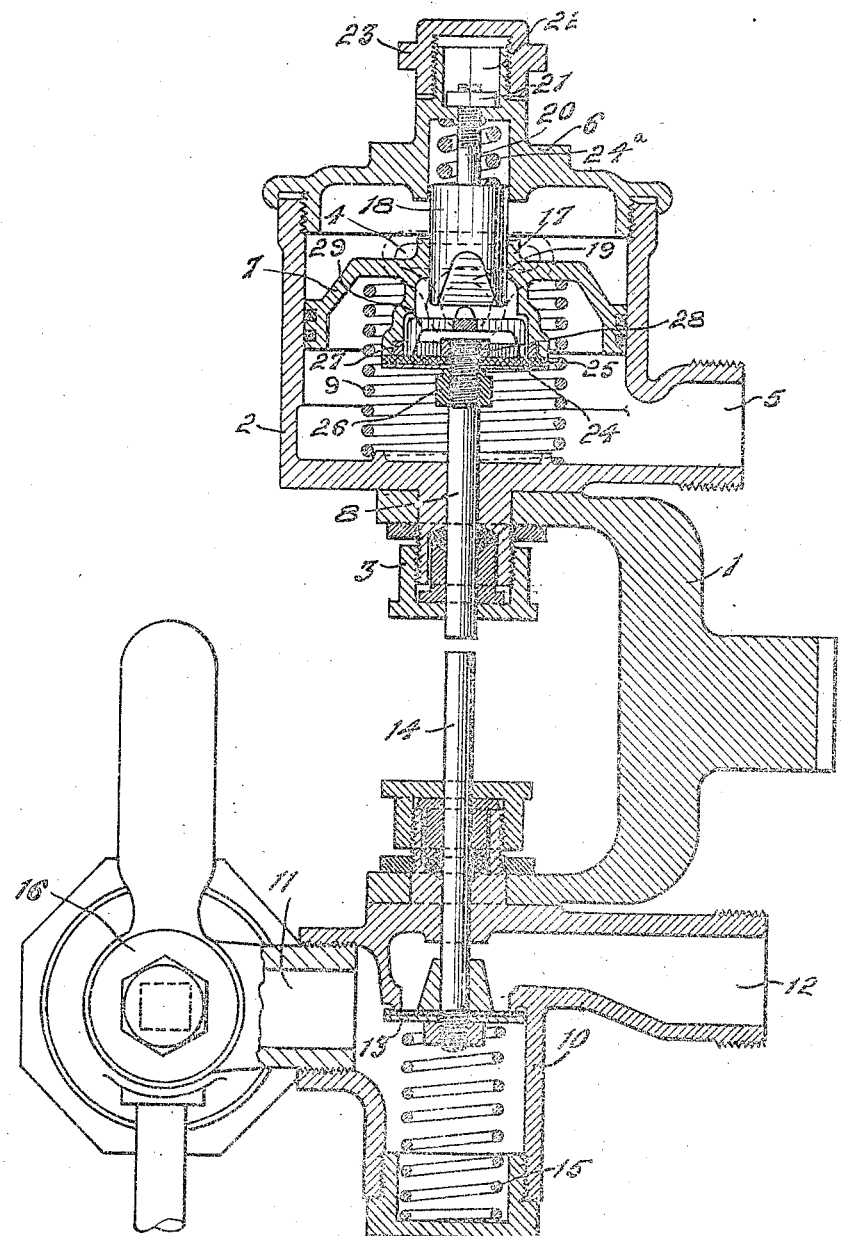

R. C. FRAMPTON.
WATER VALVE FOR INSTANTANEOUS WATER HEATERS.
APPLICATION FILED JUNE 25, 1912.

1,138,859.

Patented May 11, 1915.
2 SHEETS—SHEET 1.

WITNESSES:

R. C. Frampton, INVENTOR.

BY

ATTORNEY.

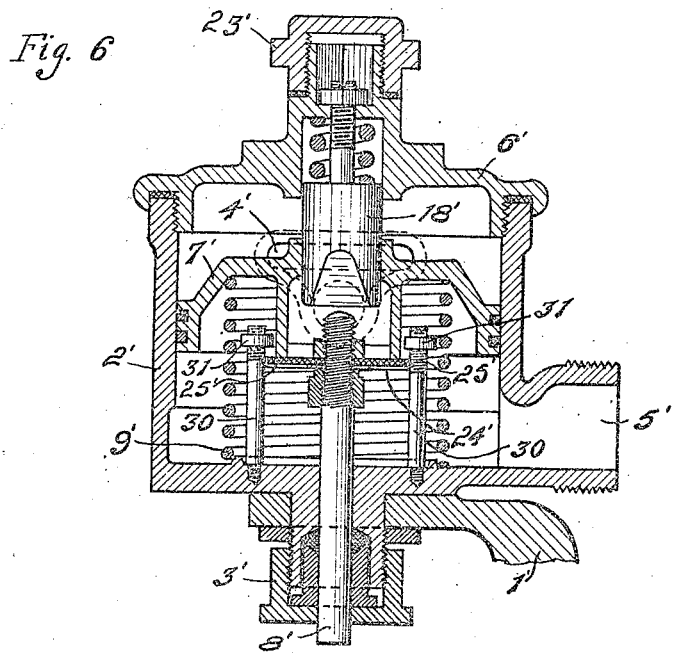
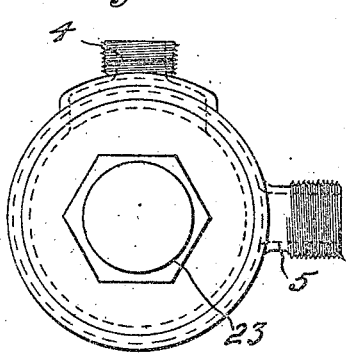
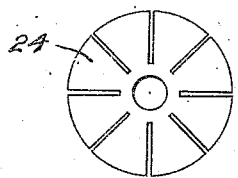
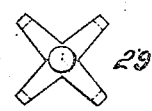
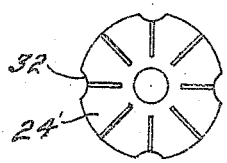
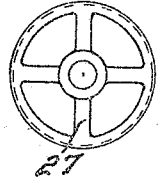

UNITED STATES PATENT OFFICE.

REYNOLDS C. FRAMPTON, OF PITTSBURGH, PENNSYLVANIA.

WATER-VALVE FOR INSTANTANEOUS WATER-HEATERS.

1,138,859.     Specification of Letters Patent.     Patented May 11, 1915.

Application filed June 25, 1912. Serial No. 705,780.

*To all whom it may concern:*

Be it known that I, REYNOLDS C. FRAMPTON, a citizen of the United States, residing at Pittsburgh, in the county of Allegheny and State of Pennsylvania, have invented certain new and useful Improvements in Water-Valves for Instantaneous Water-Heaters, of which the following is a specification.

The invention relates to water or pressure valves for instantaneous heaters and has for its primary objects; the provision of an improved and simplified form of graduated valve; the provision of an improved form of valve so constructed that the piston will be automatically moved to closed position, permitting the gas valve to close when the water in the heater rises above a predetermined temperature; and the provision of a device insuring the safety of the apparatus against overheating and explosion in case the gas valve should be accidentally stuck open.

One embodiment of the invention is illustrated in the accompanying drawings wherein—

Figure 1 is a longitudinal section through the water and gas valves employed, Fig. 2 is an end view on a reduced scale, of the water valve shown in Fig. 1, Fig. 3 is a detail plan view of the metal disk employed as a check valve, Figs. 4 and 5 are detail plan views of certain parts of the apparatus shown in section in Fig. 1, Fig. 6 is a longitudinal section through a modified form of water valve, and Fig. 7 is a plan view of the check valve employed in the structure of Fig. 6.

The principal parts of the apparatus as shown may be briefly enumerated as follows: 1 is a metal arm or support upon which the gas and water valve casings are supported; 2 is the body portion of the water valve casing, which body portion is provided with the stuffing box 3, the inlet port or passage 4, and the outlet passage 5; 6 is the cap portion of the casing; 7 is the piston of the water valve, which piston carries the piston rod 8, and is normally held in its rearmost position by means of the spring 9; 10 is the casing of the gas valve. which casing is provided with the admission passage 11 and the outlet passage 12 leading to the burners of the water heater (not shown); 13 is the gas valve, which valve carries the stem 14, and is held normally in the closed position by means of the spring 15, and 16 is a manually operable cut-off valve.

The piston 7 is provided on its rear side with a collar 17 into which fits a post 18, such post having its front end beveled as indicated at 19, for purposes set forth later. The post 18 carries at rear end a stud 20 bearing at its rear end a nut 21 so that the forward position of the post 18 may be readily adjusted by moving the nut back and forth. The nut is mounted in a recess 22 in the cap 6, and this recess is closed by means of the cap 23. The post 18 is yieldingly held in its forward position, by means of the spring $24^a$, and the fit between the rear end of the post 18 and the cap 6 is such that the post is free to move laterally to a certain extent, as well as endwise.

By inspection of Fig. 1 it will be seen that the passage through the piston which is closed at its rear end by the post 18 extends clear through the piston, and that the front end of such passage is closed by means of a spring disk 24 carrying at its rear side a packing washer 25. The disk and washer are clamped in position upon the piston rod 8 by means of the nut 26. The disk 24 is preferably made of copper having a considerable degree of springiness, and in order to further increase the resiliency of the disk it is slotted from the edge inward as indicated in Fig. 3. This spring disk 24 with its washer 25 constitutes in effect a second valve permitting a ready flow of liquid from the rear side of the piston to the front side thereof, but preventing any reverse flow. The piston rod 8 is secured to the piston 7 by means of the spider 27 shown in plan view in Fig. 5, such spider being screwthreaded at its outer edge into the piston 7 as indicated in Fig. 1, and having at its center the hollow portion 28 into which the end of the piston rod 8 is screwthreaded, the disk 24 and washer 25 being clamped between such collar 28 and the nut 26. Mounted in the passageway through the piston and between the spider 27 and the front end of the post 18 is the four-armed member 29 (Fig. 4), the ends of the arms being turned forward and engaging the face of the washer 25 as indicated in Fig. 1.

The operation of the apparatus is as follows. If a hot water faucet is opened the pressure upon the front side of the piston 7 is of course reduced, and the pressure from the inlet passage 4 causes the piston to move downwardly so that its stem or piston rod 8 engages the stem 14 of the gas valve 13, and such gas valve is opened permitting a flow of gas to the burners of the heater. The forward movement of the piston 7 causes the collar 17 to uncover the beveled portions 19 on the post 18, thus permitting a flow of water into the passage in front of the post, and the pressure at this point moves the spring disk 24 with its washer 25 outward, so that a flow of water occurs from the inlet opening 4 to the outlet opening 5, and thence through the heater to the hot water faucet. This flow continues as long as the hot water faucet is open. During this operation the piston 7 assumes a position dependent upon the amount of hot water flowing from the heater, as the greater the flow of water the farther forward the piston must move in order to provide the required area of passage between the beveled portions 19 of the post and the interior surface of the collar 17. It follows that the gas valve 13 is thus opened a distance proportional to the amount of water flowing from the heater, as the gas valve, by reason of the contacting stems 8 and 14 is opened in accordance with the forward movement of the piston 7.

If the piston of the water valve should become stuck in forward position after the outlet from the water valve had been closed, the disk 24 serves to secure the movement of the piston to its proper position, as the pressure in the heater, due to the rise in temperature of the water, will increase, and a very considerable pressure will be applied to the front side of the piston, tending to carry it to its normal rear position. The disk 24 with its washer 25 thus acts as a check valve, permitting the ready flow of liquid from the rear side of the piston to the front side, but preventing a flow in the reverse direction, so that the water in the heater may act as a thermostat to automatically close the water valve in case the pressure in the heater rises above a predetermined point. This thermostatic action will not only occur when the water piston becomes stuck in open position, but also in case the amount of gas in passing through the gas valve casing in the normal operation of the heater is too great to heat the water passing through the heater to the desired temperature, in which case the unduly heated water in the boiler will expand, causing both the piston 7 and the gas valve 13 to move either to fully or partially closed position.

The spring mounting of the throttling post 18 is advantageous in that in case of the lodgment of a particle of foreign material between the post and the collar 17 the piston 4 can still be moved to its rear position by the thermostatic action as heretofore described, the spring 24 permitting the post 18 to move rearwardly with the piston 7 under these conditions. This mounting is further advantageous in that it permits the post to adjust itself laterally to its opening in the collar 17, so that no great nicety in machine work is required in centering the post 18 with respect to the opening in the piston, and all danger of binding due to improper centering and fitting is eliminated.

The member 29 acts as a safety device in case the gas valve 13 should become stuck open as by the lodgment of a foreign particle between the gas valve and its seat. Under these conditions gas would be supplied to the burners of the heater after the outlet from the heater is closed, and as a result the heater would become overheated and explode or be otherwise injured, as the check valve 24 prevents the pressure in the heater from being reduced by the communication which would otherwise be had with the main. Under the conditions as above set forth, and with an undue accumulation of pressure in the heater, such pressure would cause the piston 7 to move upward, and this upward movement of the piston bringing the member 29 in contact with the post 18 would cause such member 29 to force the check valve 24 open, thus providing a communication between the main and the heater, and preventing any danger of an explosion due to pressure accumulated in the heater.

The construction illustrated in Fig. 6 is substantially the same as that illustrated in Fig. 1, with the exception of the safety device taking the place of the member 29 in the construction of Fig. 1. The parts 1', 2', 3', 4', 5', 6', 7', 8', 9', 10, 18', and 23' are all precisely the same in structure as the parts 1, 2, 3, 4, 5, 6, 7, 8, 9, 10, 18, and 23 in the structure of Fig. 1, and further description of such parts and their operation is therefore unnecessary. The means for operating the disk 24' comprises the pair of studs 30 screwed into the front end of the casing 2' and provided at their rear ends with the adjustable nuts 31. These studs 30 fit into recesses 32 in the edge of the disk 24' and washer 25', and the nuts 31 overhang the edge of the disk and washer. These nuts 31 constitute a means for pulling the washer 25' away from its seat when the piston 7' is moved to a point to the rear of its normal position of rest as indicated in Fig. 6. It will be seen that in case the gas valve 6 is open and the water in the heater becomes overheated or steam is formed, the expansion of the water will force the piston 7' to the rear until the nuts 31 open the check valve consisting of the parts 24' and 25', and the pressure in the heater will then become equalized by reason of the free communication with the main. The studs 30 with their nuts 31 therefore perform the same function as the part 29 in the structure of Fig. 1.

Having thus described my invention and illustrated its use, what I claim as new and desire to secure by Letters Patent, is the following:

1. In a water heater the combination with a gas valve for controlling the supply of gas to the heater, of a water valve comprising a casing having inlet and outlet ports, a piston working between the ports and cutting off communication therebetween when in both extremes of movement and provided with a passage extending from one side of the piston to the other, a check valve preventing any back flow of water from the outlet to the inlet side of the piston and normally held yieldingly in closed position, and means operated by the piston for moving the gas valve.

2. In a water heater the combination with a gas valve for controlling the supply of gas to the heater, of a water valve comprising a casing having inlet and outlet ports, a piston working between the ports and cutting off communication therebetween when in both extremes of movement, a passage extending from one side of the piston to the other, a check valve preventing any back flow of water from the outlet to the inlet side of the piston, and means operated by the piston and normally held yieldingly in closed position for moving the gas valve.

3. In a water heater the combination with a gas valve for controlling the supply of gas to the heater, of a water valve comprising a casing having inlet and outlet ports, a piston working between the ports and cutting off communication therebetween when in both extremes of movement and provided with a passage extending from one side of the piston to the other, a yielding spring disk normally closing the passage and preventing any back flow of water from the outlet to the inlet side of the piston, and means operated by the piston for moving the gas valve.

4. In a water heater the combination with a gas valve for controlling the supply of gas to the heater, of a water valve comprising a casing having inlet and outlet ports, a piston working between the ports and provided with a passage extending from one side of the piston to the other, a yielding spring disk provided on its under side with a packing and normally closing the passage whereby a back flow of water from the outlet to the inlet side of the piston is prevented, and means operated by the piston for moving the gas valve.

5. In a water heater the combination with a gas valve for controlling the supply of gas to the heater, of a water valve comprising a casing having inlet and outlet ports, a piston working between the ports and provided with a passage extending from one side of the piston to the other, a check valve for preventing a back flow of water from the outlet to the inlet side of the piston, means operated by the piston for moving the gas valve, and means for opening the check valve when the piston is moved to a position to the rear of its normal position of rest.

6. In a water heater the combination with a gas valve for controlling the supply of gas to the heater, of a water valve comprising a casing having inlet and outlet ports, a piston working between the ports and provided with a passage extending from one side of the piston to the other, a check valve for preventing a back flow of water from the outlet to the inlet side of the piston, means operated by the piston for moving the gas valve, and means supported from the casing for engaging and opening the check valve when the piston is moved to the rear of its normal position of rest.

7. In a water heater the combination with a gas valve for controlling the supply of gas to the heater, of a water valve comprising a casing having inlet and outlet ports and a throttling post projecting inwardly from the rear end of the casing and carried thereby, a piston working between the ports and provided with a passage engaged by the said post so as to be partially and variably closed thereby depending upon the longitudinal position of the piston, a check valve covering the forward end of the passage and normally preventing a flow of water from the outlet to the inlet side of the piston, means operated by the post for opening the check valve when the piston is moved to the rear of its normal position of rest, and means operated by the piston for moving the gas valve.

8. In a water heater the combination with a gas valve for controlling the supply of gas to the heater, of a water valve comprising a casing having inlet and outlet ports and a throttling post projecting inwardly from the rear end of the casing and yieldingly held in forward position, a piston working between the ports and provided with a passage engaged by the said post so as to be partially and variably closed depending upon the longitudinal position of the piston, and means operated by the piston for moving the gas valve.

9. In a water heater the combination with a gas valve for controlling the supply of gas to the heater, of a water valve comprising a casing having inlet and outlet ports, a spring-held throttling post projecting inwardly from the rear end of the casing and adapted to be moved back and forth and laterally, a piston working between the ports and provided with a passage engaged by the said post so as to be partially and variably closed thereby depending upon the longitudinal postion of the piston, and means operated by the piston for moving the gas valve.

10. In a water heater the combination with a gas valve for controlling the supply of gas to the heater, of a water valve comprising a casing having inlet and outlet ports, a movable pressure operated abutment mounted between the ports for reciprocation, and in both extremes of movement cutting off communication between said ports, a passage extending from one side of the abutment to the other, a check valve for preventing a back flow of water from the outlet to the inlet side of the abutment and normally maintained yieldingly in closed position, and means operated by the abutment for moving the gas valve.

11. In a water heater the combination with a gas valve for controlling the supply of gas to the heater, of a water valve comprising a casing having inlet and outlet ports, a movable pressure operated abutment mounted between the ports for reciprocation and provided with a passage extending from one side of the abutment to the other, a check valve preventing a back flow of water from the outlet to the inlet side of the abutment, means operated by the piston on its forward movement for moving the gas valve to open position, and means for opening the check valve when the abutment is moved to a position to the rear of its normal position of rest.

12. In a water heater the combination with a gas valve for controlling the supply of gas to the heater, of a water valve comprising a casing having inlet and outlet ports and a throttling post projecting inwardly from the rear end of the casing and yieldingly held in forward position, an abutment working between the ports and provided with a passage engaged by said post so as to be partially and variably closed, depending upon the longitudinal position of the abutment, and means operated by the abutment for moving the gas valve.

In testimony whereof I have hereunto signed my name in the presence of the two subscribed witnesses.

REYNOLDS C. FRAMPTON.

Witnesses:
   LETITIA A. MYERS,
   ARCHWORTH MARTIN.